Patented July 11, 1950

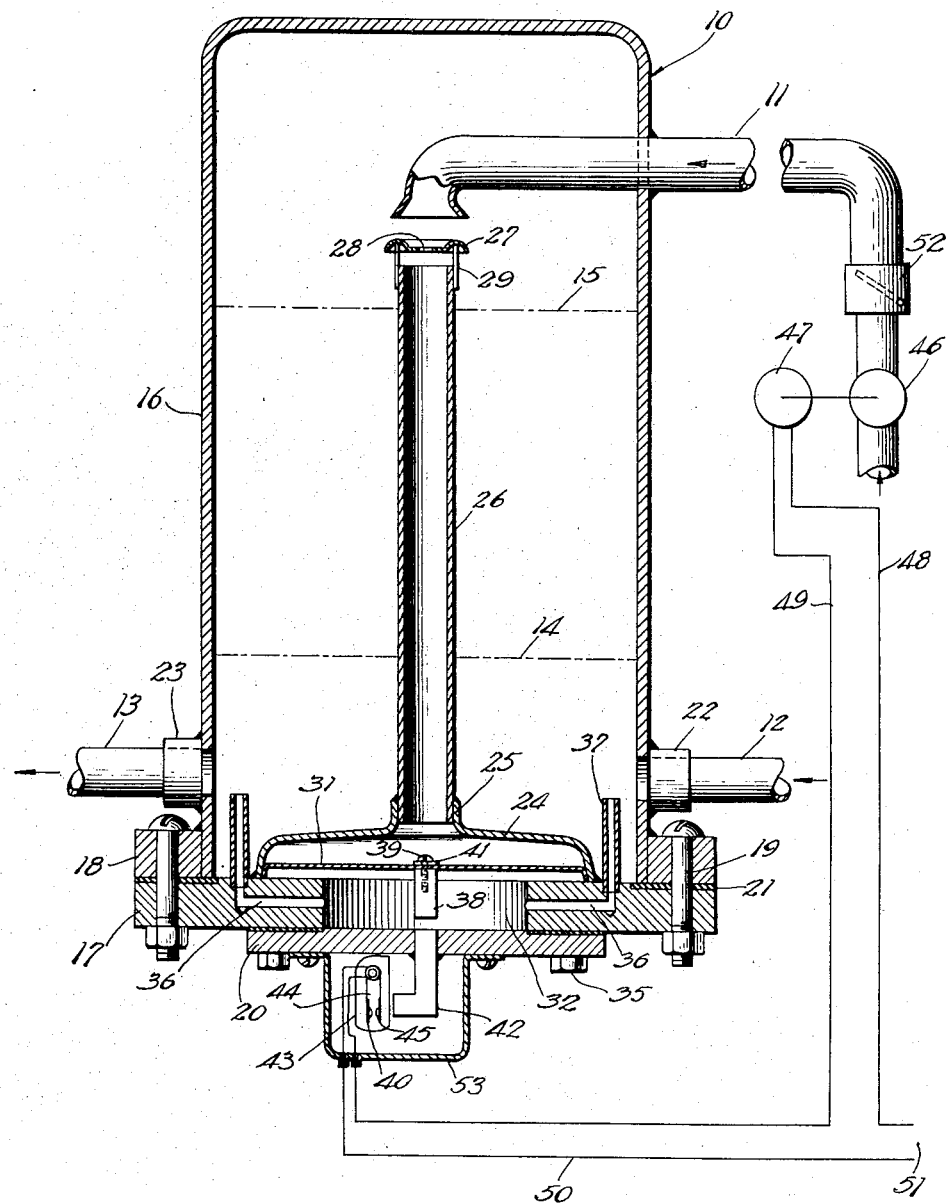

2,514,630

UNITED STATES PATENT OFFICE 2,514,630

LIQUID LEVEL CONTROL

James Robert Downing, Chicago, Ill., assignor to Cook Electric Company, Chicago, Ill., a corporation of Illinois Application December 7, 1946, Serial No. 714,872

8 Claims. (Cl. 103—25)

1

This invention relates to liquid level control devices of the balanced pressure type and more particularly to such devices for use with apparatus involving both liquids and gases or vapors such, for example, as carbonators, it being an object of the invention to provide improved apparatus of this character.

It is a further object of the invention to provide improved apparatus of the character indicated which is accurate and sensitive in operation.

It is a further object of the invention to provide improved apparatus of the character indicated which is simple in form and has a minimum of operating parts.

In carrying out the invention in one form liquid level control apparatus is provided comprising a container, liquid communicating means associated with the container, a flexible diaphragm supported inside of the container, means for subjecting one side of the diaphragm to a substantially constant liquid pressure, means for subjecting the other side of the diaphragm to the pressure of the liquid in the container, and means responsive to movements of the diaphragm affected by changes of the liquid level in said container for controlling the supplying of liquid through said communicating means.

For a more complete understanding of the invention, reference should be had to the accompanying drawing in which the sole figure is a sectional elevational view of gas and liquid mixing and storing apparatus embodying the invention.

Referring more particularly to the drawing, the invention is shown as embodied in gas and liquid apparatus 10 which, for example, may be carbonating apparatus to which water is supplied through a conduit 11, carbon dioxide gas is supplied through a conduit 12 and the mixture of gas and water, i. e. carbonated water, is extracted through a conduit 13, liquid level controlling apparatus being provided for maintaining the height of liquid between the levels indicated by the broken lines 14 and 15.

The apparatus comprises a tank 16 of any desired capacity having a cover including an annular cover ring 17 and a cover plate 20. An annular ring 18 is attached to the lower end of the tank by any desirable means such as welding, holes being provided in ring 18 through which bolts 19 may pass for attaching the cover 17 to the ring 18, and a sealing gasket 21 is arranged therebetween in order to provide a liquid and gas tight connection from the exterior to the interior of the tank. In practice, the gas pressures within such container may approach, or even exceed, pressures of the order of 200 lbs. per square inch. Consequently, the tank 16 and the cover 17 may be constructed of relatively heavy gauge metal and the material of gasket 21 may be of any material able to withstand such pressures when

2 tightly clamped by the ring 18 and cover ring 17. Adjacent the lower end of tank 16 for cooperation with the gas conduit 12 and the mixture conduit 13 respectively, there is a pair of connectors 22 and 23 attached to the tank by any desirable method such as welding, for example, in a liquid and gas tight manner. The conduit 11 supplying liquid to container 16 passes through a suitable opening therein and is welded thereto as shown also to provide a liquid and gas tight connection, the conduit 11 extending inwardly of the tank to approximately the center thereof for a purpose to be described.

Inside of tank 16 there is an inverted cup shaped member 24 having its outer periphery welded exteriorly to the inside surface of cover ring 17, the member 24 being arranged substantially concentrically therewith. Centrally of member 24 there is an upwardly extended flange 25 to which a vertical standpipe 26 is attached, for example, as by welding, the upper end of the standpipe extending slightly above the upper liquid level (broken line 15) and lying directly underneath the inside end of conduit 11. At the upper end of the standpipe there is a shield 27 including a central opening 28, the shield being spaced upwardly from the end of the standpipe and attached thereto by means of circumferentially spaced members 29. The shield 27 has a sufficient diameter so as to extend somewhat beyond the outer diameter of pipe 26. The inside end of conduit 11 is bent downwardly and has a portion flared outwardly to directly overlie shield 27.

Within cup shaped member 24 there is a thin flexible diaphragm 31 of substantially the same diameter as the inside diameter of the cup shaped member, the diaphragm including a downwardly extending flange which is welded, for example, to the outer periphery of member 24 interiorly thereof to form a liquid and gas tight connection. The diaphragm is sufficiently flexible to deflect when there is increased force on one side thereof than on the other and to return to an equilibrium position when the force is equal on both sides.

Substantially centrally of cover ring 17 is a circular opening 32 which is closed by the removable cover plate 20 and a sealing gasket 34, the cover plate being held to ring 17 by means of screws 35. The diaphragm 31 and cover plate 20 having a gas and liquid tight connection with ring 17 define a chamber with opening 32 which is isolated from the exterior of the tank proper and is in communication with the inside of the tank through a series of radially and longitudinally extending passageways 36, vertical tubes 37 communicating with passageways 36 and extending to about the level of conduit 12. Since diaphragm 31 is attached in a liquid and gas tight manner to cup 24, it is evident that the diaphragm in effect forms two chambers, one defined by the space beneath the diaphragm and another defined by the space above the diaphragm including the inside of tank 16, these chambers being in communication with each other by means of the passageways 36.

Inside of the chamber defined in part by opening 32, there is a permanent magnet 38 attached to diaphragm 31 centrally thereof by any suitable means such as a screw 39 and a gasket 41, the magnet preferably being of the high intensity and high retentivity type known as alnico No. 5. Spaced directly underneath the magnet 38 and extending exteriorly of cover plate 20 is a soft iron armature 42. Armature 42 extends through the cover plate 20 to the inside thereof and is attached thereto by any suitable means such as welding, for example, to form a gas and liquid tight connection. Exteriorly of cover plate 20 and adjacent the armature 42 there is a switch 43 including a pair of contacts 44 and 45 spring biased apart so as to form a normally open circuit, the contact 44 including a small iron armature 40 lying opposite to a right angularly extending portion of the armature 42. The permanent magnet 38 movable with diaphragm 31 is arranged to come into close contact with the armature 42 when the liquid level in the tank is at its lower limit (broken line 14), and is arranged to be moved away from armature 42 due to the resilience of diaphragm 31 and the balance of forces on each side thereof when the liquid level is at its upper limit (broken line 15). When magnet 38 is adjacent armature 42, the magnetism extends therethrough and attracts the soft iron armature 40. Consequently contact 44 engages contact 45 to effect initiation of liquid flow through conduit 11 as will be more completely described. When magnet 38 is spaced away from armature 42 there is relatively little magnetism to attract armature 40 and hence the resilience of contact 44 causes it to disengage contact 45 thereby stopping the flow of liquid through conduit 11. A cover 53 attached to plate 20 by screws as shown houses switch 43 and armature 42.

Liquid may be supplied to conduit 11 by means of a liquid pump 46 driven by an electric motor 47 to which power is supplied through conductors 48 and 49 from a source of power 51. The complete electrical circuit is established from source 51 through conductor 50 to contact 44, through contact 45 and conductor 49 to motor 47 and from motor 47 through conductor 48 to source 51. A check valve 52 is provided in conduit 11 to permit flow in the direction of the arrows and to prevent flow in the reverse direction when pump 46 is not operating, check valve 52 preventing reverse flow both for liquid as well as for gas. In operation, conduit 12 may be connected to a source of gas at all times so that gas may bubble up through the liquid within the tank continuously to form an atmosphere of gas above the liquid. Any desired mixture consuming apparatus may be attached to conduit 13 whereby the gas and liquid mixture may be drawn off as desired.

Assuming that the liquid level is at the upper limit (broken line 15) it will be evident that the force acting on the under side of diaphragm 31 is a resultant of the height of the liquid and the pressure of the gas above the liquid. Similarly, since the tank 16 was filled by liquid flowing in through conduit 11 which thereby contacted the shield 27 and also filled the inside of standpipe 26 with liquid through opening 28, the force on the upper side of diaphragm 31 is equal to the height of the liquid in standpipe 26 and the pressure of the gas above the liquid. The upper end of standpipe 26 being closely adjacent the upper liquid level, the forces acting on the two sides of the diaphragm are substantially equal. Under the effects of the substantially equal forces diaphragm 31 occupies an equilibrium position with magnet 38 spaced away from armature 42. It being preferable to have the forces on both sides of the diaphragm substantially equal when the liquid is at the upper level, the upper end of standpipe 26 may have the same height as the upper liquid level if desired. Because of this substantial equality in forces the resilience of the diaphragm need only support its own weight plus that of the magnet and the force of attraction of the magnet for armature 42, which latter force is not great when the magnet is spaced away from the armature. Consequently, diaphragm 31 may be made very thin and very flexible in order that it may respond positively and accurately to very small differences in pressure such as are effected by a change in water level of a few inches.

If the mixture is drawn off through conduit 13 so that the level drops from the upper limit to the lower limit, the forces on the two sides of the diaphragm will no longer be equal. The force now on the under side of the diaphragm is the sum of the height of the liquid in the tank (broken line 14) and the pressure of the gas which will remain constant. The force on the upper side of the diaphragm remains the same as before since the amount of liquid in standpipe 26 does not change when the mixture is drawn off from the container. Hence the force tending to depress the diaphragm remains substantially constant. Under this constant force, when the force on the under side of the diaphragm decreases due to the decrease of mixture in the tank, the diaphragm deflects to bring magnet 38 closely adjacent to armature 42 thereby effecting closing of contacts 44 and 45 to complete the electric circuit from source 51 to motor 47. Consequently the motor begins to run and causes pump 46 to supply liquid to tank 16. The liquid flowing into the tank 16 through conduit 11 impinges against the upper side of shield 27 and splashes off into the container thereby becoming thoroughly mixed with the gas therein. At the same time the liquid flowing through opening 28 maintains the column of liquid in pipe 26 at its full height. As the liquid level begins to rise, the force on the under side of the diaphragm increases while the force on the upper side thereof again remains constant and when the liquid level reaches its upper limit the forces on the two sides of the diaphragm being substantially the same, the resilience of the diaphragm causes it to return to its equilibrium position to remove magnet 38 from armature 42. The contacts 44 and 45 therefore open to interrupt the power circuit to motor 47 thereby stopping the flow of liquid into the tank.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Liquid level control apparatus comprising a container, liquid communicating means associated with said container, a resilient diaphragm movable under the influence of the liquid in said container, and magnetic means associated with and at least a portion thereof being movable with said diaphragm in response to changes in liquid level in said container for controlling the supplying of liquid through said communicating means.

2. Liquid level control apparatus comprising a container, liquid communicating means associated with said container, a resilient diaphragm movable under the influence of the liquid in said container, a permanent magnet movable with said diaphragm inside of said container, and means exterior to said container operable in response to the movements of said magnet affected by the level of the liquid in said container for controlling the supplying of liquid through said communicating means.

3. Liquid level control apparatus comprising a container, liquid communicating means associated with said container, a flexible diaphragm supported inside of said container adjacent the lower end thereof, liquid containing means for subjecting one side of said diaphragm to substantially constant liquid pressure, means including communicating means between the underside of said diaphragm and the inside of said container for subjecting the other side of said diaphragm to the pressure of the liquid in said container, and means responsive to the movement of said diaphragm affected by changes in the liquid level in said container for controlling the supplying of liquid through said communicating means.

4. Liquid level control apparatus comprising a container, liquid communicating means associated with said container, a flexible diaphragm supported inside of said container, means for subjecting one side of said diaphragm to a substantially constant liquid pressure, means for subjecting the other side of said diaphragm to the pressure of the liquid in said container, magnetic means carried by said diaphragm, and means exterior to said container operable in response to movements of said magnet affected by changes in the liquid level in said container for controlling the supplying of liquid through said communicating means.

5. Liquid level control apparatus comprising a container, liquid communicating means associated with said container, a resilient diaphragm supported inside of said container adjacent the lower end thereof and having an equilibrium position when the pressures on each side thereof are equal, a stand pipe on one side of said diaphragm cooperating with said liquid communicating means for maintaining a substantially constant liquid pressure on said one diaphragm side, means connecting the other side of said diaphragm to the inside of said container whereby said other diaphragm side is subject to the pressure of the liquid in said container, and means responsive to the movement of said diaphragm effected by changes in the liquid level in said container for controlling the supplying of liquid through said communicating means.

6. Liquid level control apparatus comprising, a container, conduit means having its end extend into said container for supplying liquid thereto, a resilient diaphragm supported inside of said container adjacent the lower end thereof and having an equilibrium position when the pressures on each side thereof are equal, a stand pipe on one side of said diaphragm for maintaining a substantially constant liquid pressure on said one diaphragm side, said stand pipe having an upper end disposed under the end of said conduit means whereby said stand pipe is maintained filled with liquid, means connecting the other side of said diaphragm to the inside of said container whereby said other diaphragm side is subject to the pressure of the liquid in said container, and means responsive to the movement of said diaphragm effected by changes in the liquid level in said container for controlling the supplying of liquid through said communicating means.

7. Liquid level control apparatus comprising, a container, conduit means having its end extend into said container for supplying liquid thereto, a resilient diaphragm supported inside of said container adjacent the lower end thereof and having an equilibrium position when the pressures on each side thereof are equal, a stand pipe on one side of said diaphragm for maintaining a substantially constant liquid pressure on said one diaphragm side, said stand pipe having an upper end disposed under the end of said conduit means whereby said stand pipe is maintained filled with liquid, means connecting the other side of said diaphragm to the inside of said container whereby said other diaphragm side is subject to the pressure of the liquid in said container, and magnetic means actuated by said diaphragm in response to predetermined liquid level changes in said container for controlling the supply of liquid through said conduit means.

8. Liquid level control apparatus comprising, a container, a conduit having its end extend into the upper end of said container for supplying liquid thereto, an annular member at the lower end of said container, a resilient diaphragm on the upper side of said annular member, a closure on the lower side of said annular member, said diaphragm, the central portion of said annular and said closure forming a chamber, means for connecting said chamber with the inside of said container whereby the underside of said diaphragm is subjected to the pressure of liquid in said container, a stand pipe overlying the upper side of said diaphragm for maintaining a substantially constant liquid pressure on said upper diaphragm side, said stand pipe having an upper end disposed under the end of said conduit means whereby said stand pipe is maintained filled with liquid, magnetic means carried by said diaphragm, and switch means influenced by said magnetic means upon predetermined changes in liquid level in said container for controlling the supply of liquid through said conduit means.

JAMES ROBERT DOWNING.

REFERENCES CITED

The following references are of record in the file of this patent:

UNITED STATES PATENTS

| Number | Name | Date |
|---|---|---|
| 978,103 | Bastian | Dec. 6, 1910 |
| 1,201,660 | Weatherhead et al. | Oct. 17, 1916 |
| 1,253,687 | Hicks | Jan. 15, 1918 |
| 1,814,454 | Penn | July 14, 1931 |
| 2,078,479 | Briggs | Apr. 27, 1937 |
| 2,217,841 | Holinger | Oct. 15, 1940 |
| 2,300,300 | Lund | Oct. 27, 1942 |